United States Patent
Bennett

(10) Patent No.: US 11,642,836 B2
(45) Date of Patent: May 9, 2023

(54) REMOVABLE WINDOW CASSETTE FOR AN ADDITIVE MANUFACTURING APPARATUS

(71) Applicant: Carbon, Inc., Redwood City, CA (US)

(72) Inventor: James Michael Ian Bennett, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/267,128

(22) PCT Filed: Sep. 27, 2019

(86) PCT No.: PCT/US2019/053401
§ 371 (c)(1),
(2) Date: Feb. 9, 2021

(87) PCT Pub. No.: WO2020/069281
PCT Pub. Date: Apr. 2, 2020

(65) Prior Publication Data
US 2021/0162655 A1   Jun. 3, 2021

Related U.S. Application Data

(60) Provisional application No. 62/738,049, filed on Sep. 28, 2018.

(51) Int. Cl.
*B29C 64/124* (2017.01)
*B29C 64/245* (2017.01)
(Continued)

(52) U.S. Cl.
CPC .......... *B29C 64/124* (2017.08); *B29C 64/245* (2017.08); *B29C 64/259* (2017.08); *B33Y 30/00* (2014.12)

(58) Field of Classification Search
CPC ..... B29C 64/20; B29C 64/245; B29C 64/249; B29C 64/124; B29C 64/129; B29C 64/135; B33Y 30/00
See application file for complete search history.

(56) References Cited

U.S. PATENT DOCUMENTS

| | | | | |
|---|---|---|---|---|
| 5,009,585 A | * | 4/1991 | Hirano | B29C 64/135 |
| | | | | 118/500 |
| 5,391,072 A | * | 2/1995 | Lawton | B29C 64/129 |
| | | | | 264/401 |

(Continued)

FOREIGN PATENT DOCUMENTS

| | | | |
|---|---|---|---|
| CN | 206840705 U | * | 1/2018 |
| CN | 207657186 U | * | 7/2018 |

(Continued)

OTHER PUBLICATIONS

International Search Report and Written Opinion for PCT/US2019/053401 dated Jan. 9, 2020, 23 pages.

*Primary Examiner* — Jerzi H Moreno Hernandez
(74) *Attorney, Agent, or Firm* — Myers Bigel, P.A.

(57) ABSTRACT

A removable window cassette (100) for a bottom-up stereolithography apparatus includes (a) a light-transmissive window (110) having a rigid bottom portion (112), a semipermeable top portion (114), and a fluid flow region therebetween; (b) a circumferential frame (120) surrounding said window and into which said window is recessed, said frame having a top portion, a bottom portion, and an internal wall portion (120C), said frame internal wall portion defining with said window semipermeable top portion a well into which a polymerizable liquid may be received; and (c) a plurality of clamp draw-in pins (140) connected to said frame bottom portion and extending downward therefrom; and (d) at least a first and second port (150A, 150B) connected to said frame bottom portion, with said first port in fluid communication with said second port through said window fluid flow region.

15 Claims, 6 Drawing Sheets

(51) Int. Cl.
 *B33Y 30/00* (2015.01)
 *B29C 64/259* (2017.01)

(56) References Cited

U.S. PATENT DOCUMENTS

| | | | | |
|---|---|---|---|---|
| 5,961,261 A | * | 10/1999 | Stark | B23Q 11/005 |
| | | | | 409/219 |
| 2007/0030018 A1 | * | 2/2007 | Thurmaier | G01R 31/2887 |
| | | | | 324/756.04 |
| 2015/0034007 A1 | * | 2/2015 | Fischer | B29C 64/129 |
| | | | | 118/620 |
| 2016/0229123 A1 | * | 8/2016 | Carlson | B33Y 30/00 |
| 2018/0178452 A1 | * | 6/2018 | Costabeber | B29C 64/135 |
| 2018/0222115 A1 | | 8/2018 | Watanabe et al. | |
| 2018/0370136 A1 | * | 12/2018 | Stadlmann | B29C 64/124 |
| 2019/0099948 A1 | * | 4/2019 | El-Siblani | B29C 64/129 |
| 2019/0111622 A1 | * | 4/2019 | Khalip | B29C 64/135 |
| 2019/0152144 A1 | * | 5/2019 | Munro | B29C 64/20 |
| 2020/0094468 A1 | * | 3/2020 | Feller | B29C 64/124 |

FOREIGN PATENT DOCUMENTS

| | | |
|---|---|---|
| CN | 207657186 U | 7/2018 |
| DE | 102013215040 A1 | 2/2015 |
| WO | 2017079774 A2 | 5/2017 |

\* cited by examiner

REMOVABLE WINDOW CASSETTE FOR AN ADDITIVE MANUFACTURING APPARATUS

RELATED APPLICATIONS

This application is a 35 U.S.C. § 371 national phase entry of International Application No. PCT/US2019/053401, filed Sep. 27, 2019, which claims priority to U.S. Provisional Application Ser. No. 62/738,049, filed Sep. 28, 2018, the disclosures of which are hereby incorporated by reference in their entirety.

FIELD OF THE INVENTION

The present invention concerns additive manufacturing in general, and particularly concerns high throughput systems employing streolithography-type additive manufacturing.

BACKGROUND OF THE INVENTION

A group of additive manufacturing techniques sometimes referred to as "stereolithography" create a three-dimensional object by the sequential polymerization of a light polymerizable resin. Such techniques include "bottom-up" techniques, where light is projected into the resin through a light-transmissive "window" onto the bottom of the growing object, which object is carried up and out of the resin pool on a "build platform."

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Eimoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

The foregoing developments have in turn lead to a need for window cassettes that can be more rapidly exchanged in bottom-up additive manufacturing apparatus, while maintaining good alignment, so that greater numbers of objects can be produced on the apparatus.

SUMMARY OF THE INVENTION

In some embodiments, a removable window cassette for a bottom-up stereolithography apparatus includes (a) a light-transmissive window having a rigid bottom portion, a semipermeable top portion, and a fluid flow region therebetween; (b) a circumferential frame surrounding said window and into which said window is recessed, said frame having a top portion, a bottom portion, and an internal wall portion, said frame internal wall portion defining with said window semipermeable top portion a well into which a polymerizable liquid may be received; and (c) a plurality of clamp draw-in pins connected to said frame bottom portion and extending downward therefrom; and (d) at least a first and second port connected to said frame bottom portion, with said first port in fluid communication with said second port through said window fluid flow region.

In some embodiments, the circumferential frame is rectangular.

In some embodiments, the circumferential frame has a front portion, a back portion, and opposite side portions, with said first port positioned on one of said side portions, and said second port positioned on the other of said side portions. The circumferential frame may have a front portion, a back portion, and opposite side portions. A lifting slot may be formed in each of said side portions, with said lifting slots parallel to and aligned with one another. The lifting slots may extend through said frame front portion.

In some embodiments, the window semipermeable top portion is comprised of a fluoropolymer.

In some embodiments, the window rigid bottom portion is comprised of glass.

In some embodiments, said plurality of clamp draw-in pins comprise four draw-in pins.

In some embodiments, said window is generally flat and planar.

In some embodiments, the frame has a unique identifier (e.g., an NFC tag) connected thereto.

In some embodiments, the frame internal wall portion has a top segment adjacent said frame top portion, a bottom segment adjacent said window, and an intermediate segment between said top segment and bottom segment, with both said bottom segment and said top segment have a steeper slope than that of said intermediate segment (the segments configured to facilitate the flow of polymerizable resin onto the light-transmissive window during additive manufacturing of at least one object thereon).

The foregoing and other objects and aspects of the present invention are explained in greater detail in the drawings herein and the specification set forth below. The disclosures of all United States patent references cited herein are to be incorporated herein by reference.

DETAILED DESCRIPTION FO ILLUSTRATEIVE EMBODIMENTS

Figure 1:
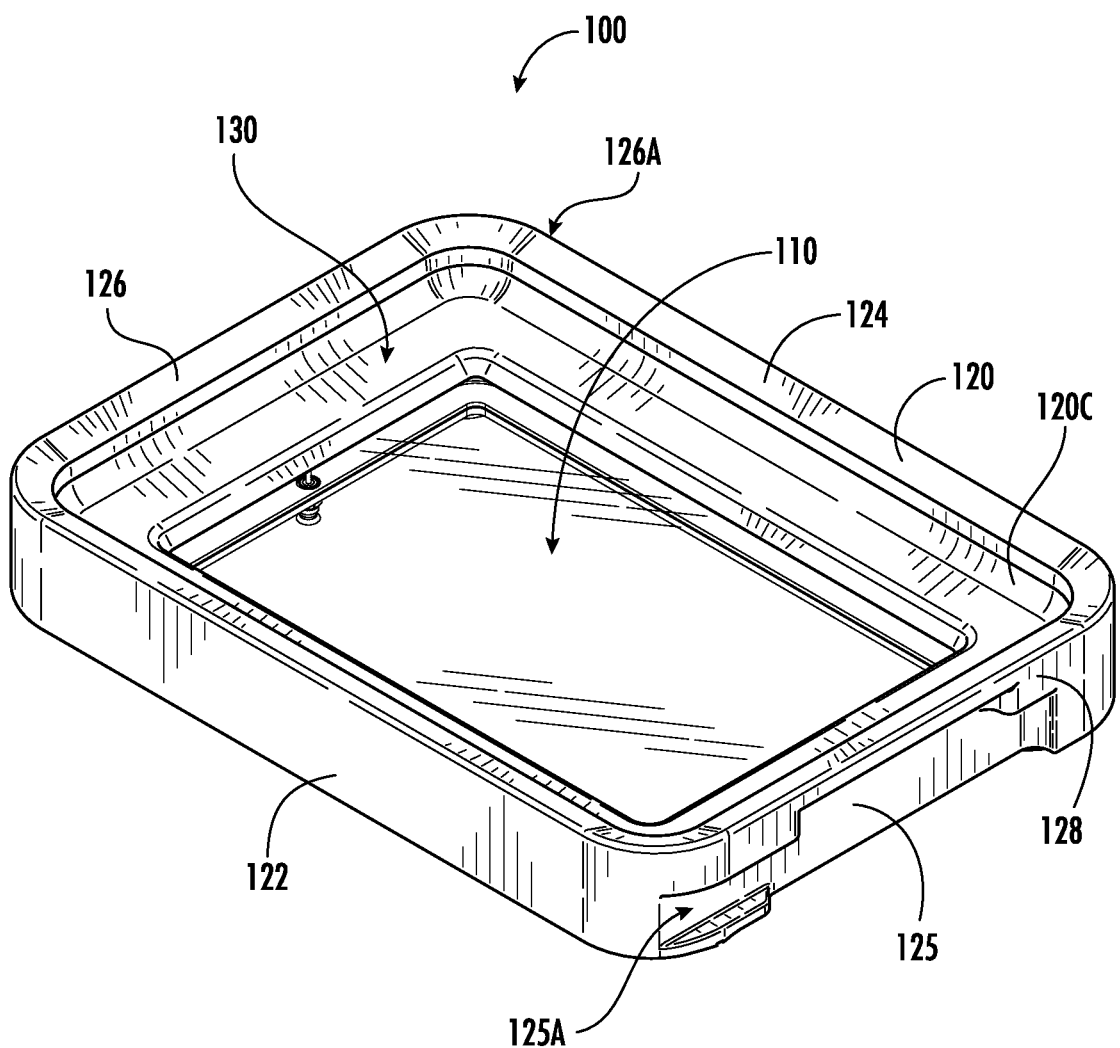
FIG. 1 is a top perspective view of a window cassette according to some embodiments.
Figure 2:
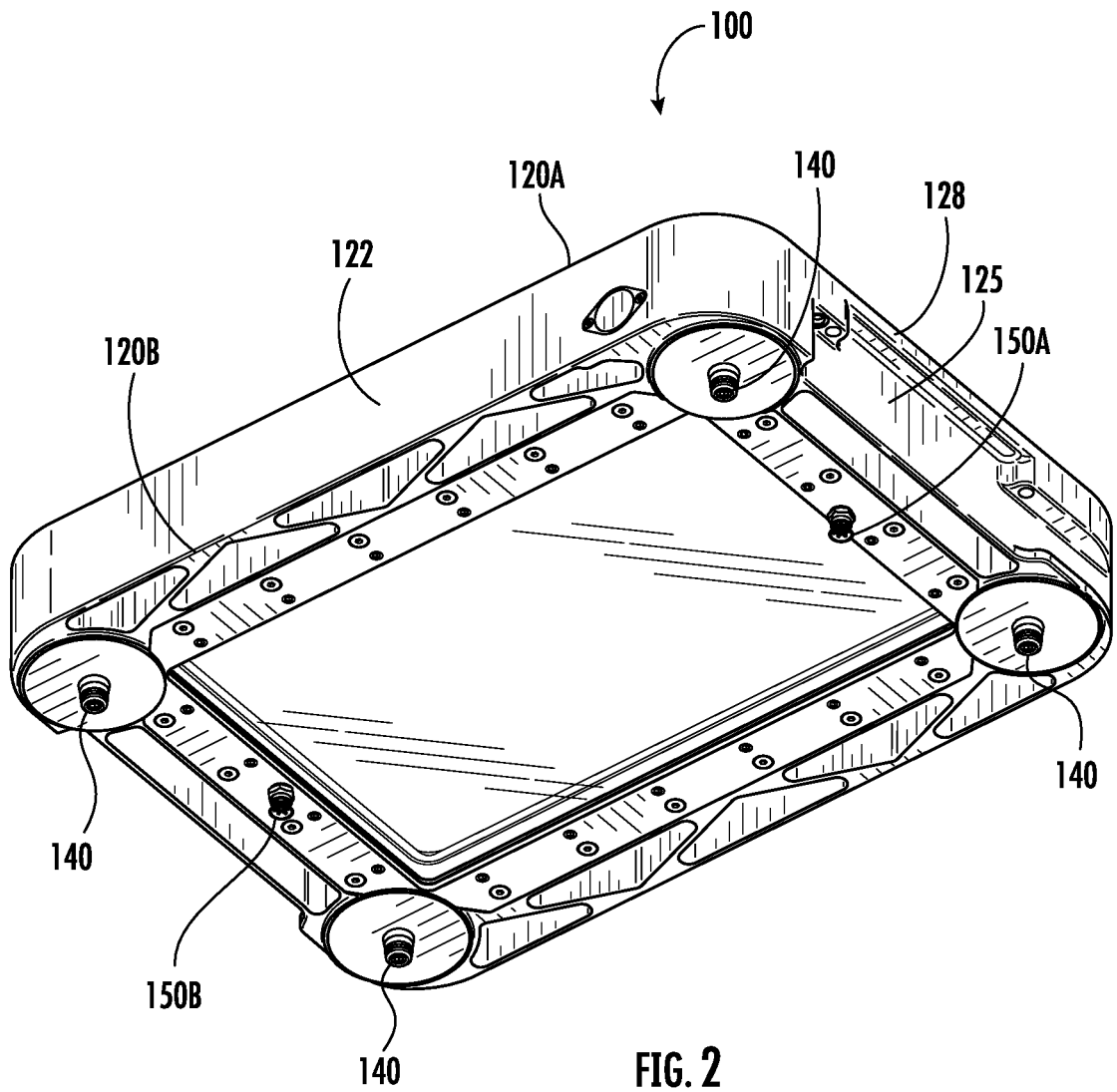
FIG. 2 is a bottom perspective view of the window cassette of FIG. 1.
Figure 3:
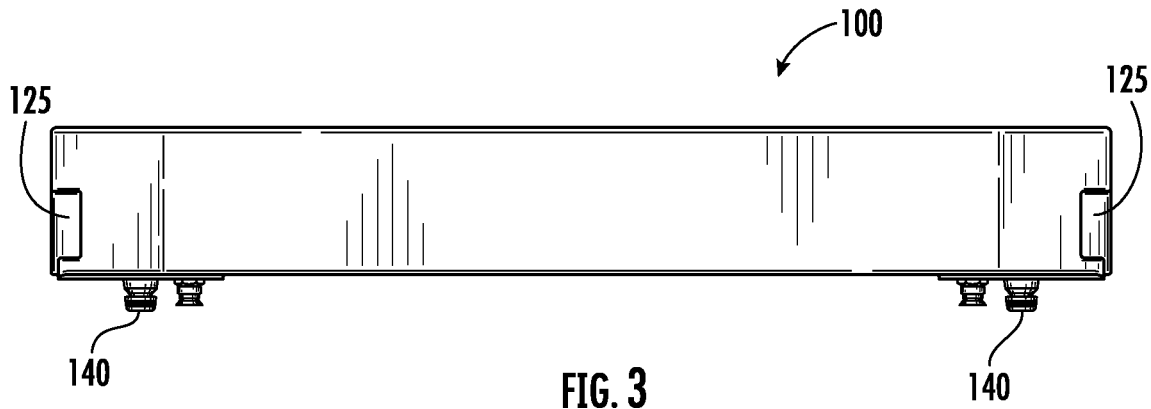
FIG. 3 is a front view of the window cassette of FIG. 1.
Figure 4:
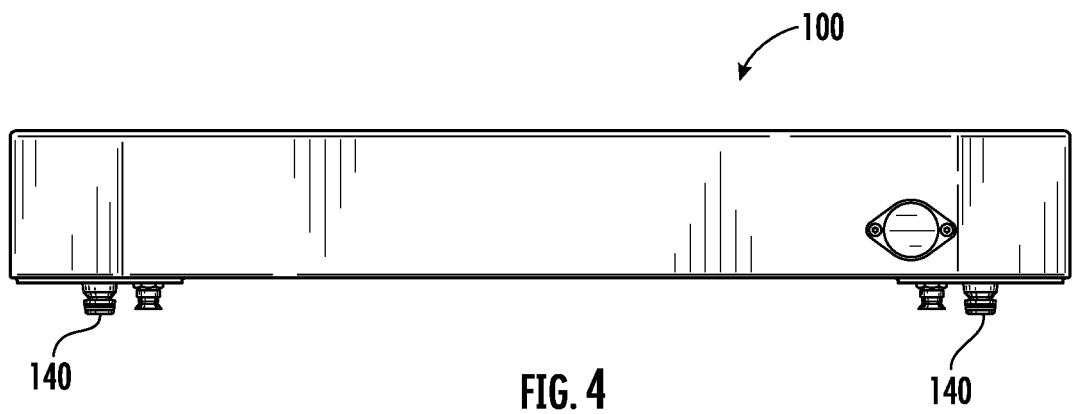
FIG. 4 is a back view of the window cassette of FIG. 1.
Figure 5:
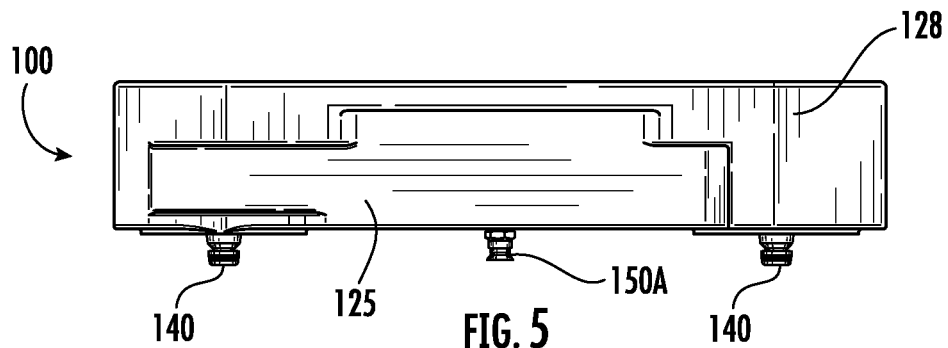
FIG. 5 is a side view of the window cassette of FIG. 1.
Figure 6:
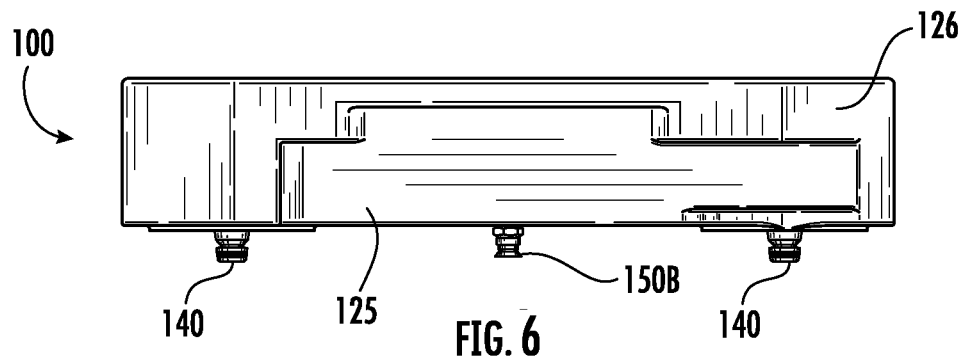
FIG. 6 is an opposing side view of the window cassette of FIG. 1.
Figure 7:
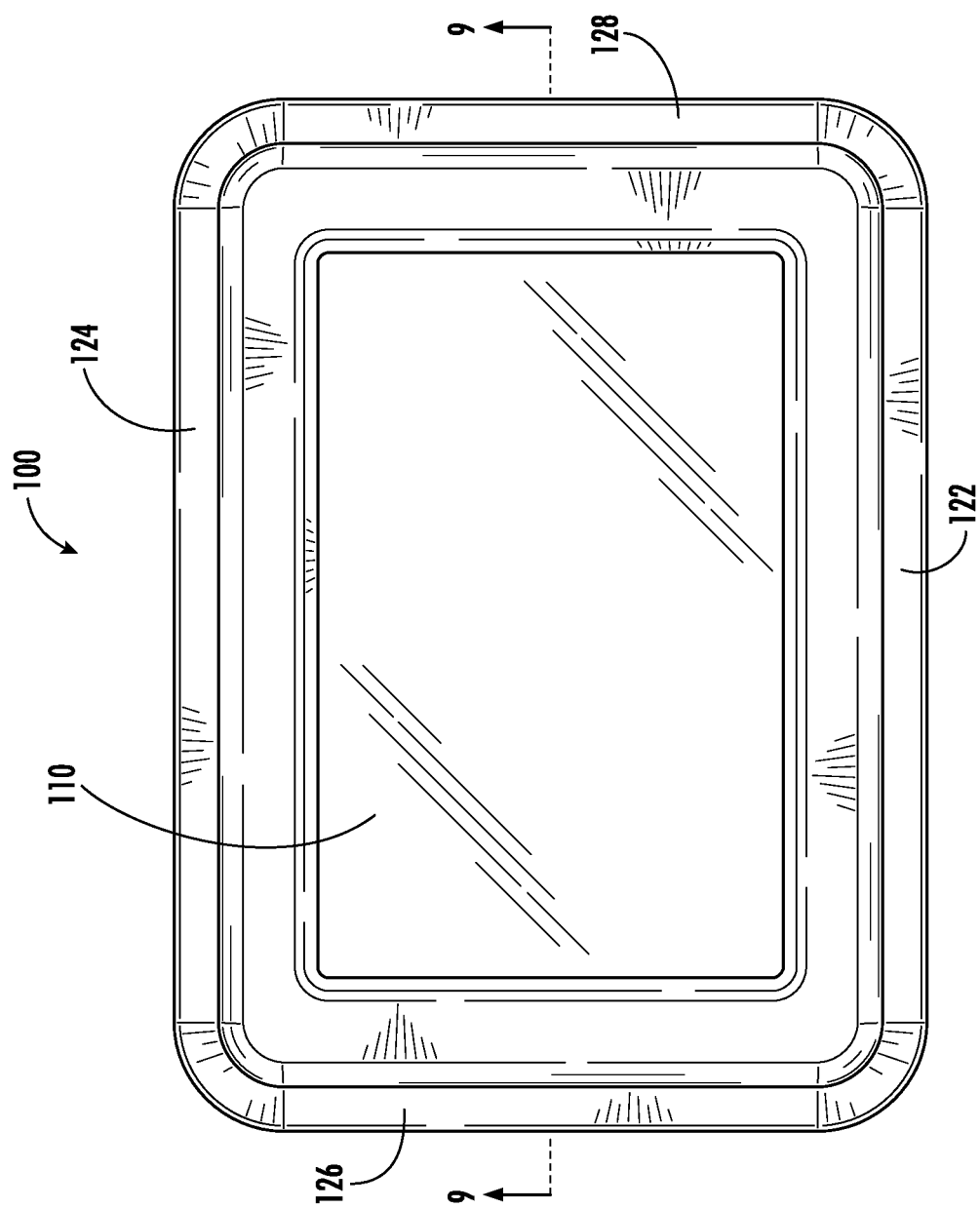
FIG. 7 is a top view of the window cassette of FIG. 1.
Figure 8:
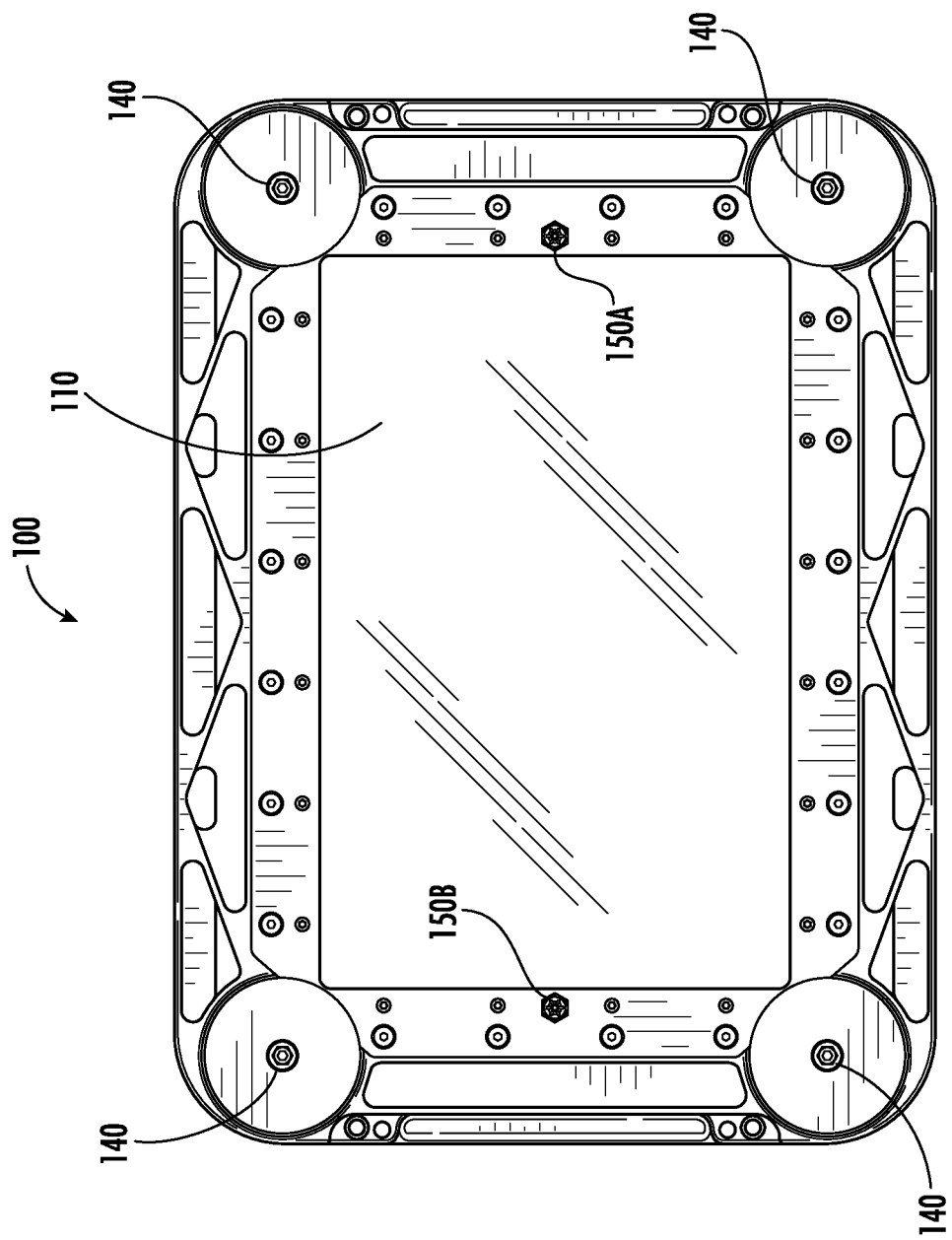
FIG. 8 is a bottom view of the window cassette of FIG. 1.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing Apparatus.

Conventional (or "single cure") resins, or dual cure resins, can be used in carrying out aspects of the present invention. Examples include but are not limited to those described in DeSimone et al., U.S. Pat. No. 9,211,678; in Rolland et al., U.S. Pat. Nos. 9,676,963; 9,598,606; and 9,453,142, and in Wu et al., US Patent Application Pub. No. US2017/0260418, the disclosures of which are incorporated herein by reference. Example dual cure resins include, but are not limited to, Carbon Inc. EPU 40, EPU 41, FPU, RPU 70, SIL 30, and EPX 82 resins, all available from Carbon Inc. 1089 Mills Way, Redwood City, Calif. 94063 USA.

Apparatus and methods for carrying out additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, U.S. Pat. Nos. 9,211,678, 9,205,601, 9,216,546, and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

In preferred embodiments, the additive manufacturing apparatus is a bottom-up stereolithography apparatus (including but not limited to apparatus carrying out CLIP), employing a removable window cassette, such as described in B. Feller et al., *Three-dimensional printing with build plates having reduced pressure and/or channels for increased fluid flow*, PCT Patent Application Pub. No. WO 2018/006029, or B. Feller et al., *Three-dimensional printing method and apparatus for reducing bubbles by de-gassing through build plate*, PCT Patent Application Pub. No. WO 2018/006018 (where "build plate" refers to the "window cassette").

2. Window Cassette

Figure 9:
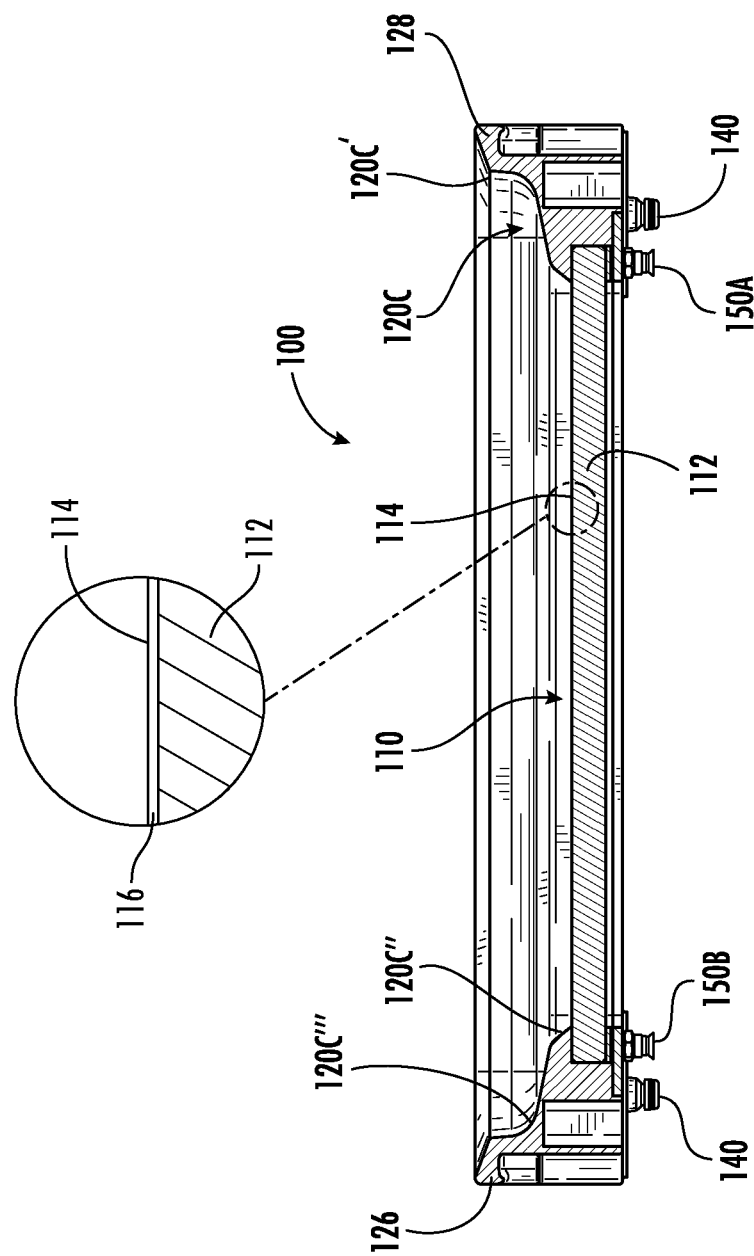
FIG. 9 is a cut-away view of the window cassette along the lines 9-9 of FIG. 8.

As illustrated in FIGS. 1-9, a removable window cassette 100 for a bottom-up stereolithography apparatus includes a light-transmissive window 110 having a rigid bottom portion 112, a semipermeable top portion 114 on the bottom portion 112 and a fluid flow region 116 therebetween (see FIG. 9). The cassette 100 includes a circumferential frame 120 surrounding the window 110 and into which said window 110 is recessed. The frame 120 includes a top portion 120A, a bottom portion 120B (see FIG. 2) and an internal wall portion 120C. The frame internal wall portion 120C together with the window semipermeable top portion 114 defines a well 130 into which a polymerizable liquid may be received. The cassette 100 includes a plurality of clamp draw-in pins 140 connected to the frame bottom portion 120B and extending downward therefrom (see FIG. 2). At least a first and second port 150A, 150B are connected to the frame bottom portion 120B such that the first port 150A is in fluid communication with the second port 150B through the window fluid flow region 116.

In this configuration, the claim clamp draw-in pins 140 may be used to removably secure the window cassette 100 in position on a stereolithography apparatus. The stereolithography apparatus may include a mounting platform configured to receive the clamp draw-in pins 140 for mounting the cassette 100 thereto. Clamp draw-in pins (also referred to as clamping pins, draw-in bolts, and pull-in nipples), and their associated clamping mechanisms, are known and described in, for example, U.S. Pat. Nos. 8,066,289; 6,283,465; and 5,961,261. In preferred embodiments, the clamp and associated draw-in pins are VERO-S NSE mini quick-change pallet system components, available from Schunk Intec Inc., 211 Kitty Hawk Drive, Morrisville, N.C. 27560 USA.

In some embodiments, the circumferential frame 120 is rectangular, although additional shapes may be used, such as a square, oval or circle.

As illustrated, the circumferential frame 120 has a front portion 122, a back portion 124, and opposite side portions 126, 128, and the first and second ports 150A, 150B are on the respective side portions 126, 126. A lifting slot 125 may be formed in each of said side portions 126, 128 such that the lifting slots 125 are parallel to and aligned with one another. The lifting slots 125 may extend through the frame front portion 122, for example, to form an opening 125A.

Thus, a lifter, for example, having parallel extending arms that cooperate with the lifting slots 125, may be used to move the cassette 100 by inserting the arms through the openings 125A and engaging with the lifting slots 125. Window cassettes 100 according to some embodiments can be more rapidly exchanged in a bottom-up additive manufacturing apparatus by using the lifting slots 125. In some embodiments, the lifter may be a robotic lifter that provides automated placement/mounting and/or removal of the cassette 100 in a stereolithography apparatus. However, a manual lifter may also be used to manually place or mount the cassette 100 and/or remove the cassette 100 from a stereolithography mounting platform.

In addition, the clamp draw-in pins 140 may facilitate improved alignment of the cassette 100 on a stereolithography apparatus. For example, mating receptacles may be provided on the stereolithography apparatus, such as on a mounting platform, to receive the cassette 100 at a particular orientation and to secure the cassette 100 at a desired alignment.

In some embodiments, the window semipermeable top portion 114 is comprised of a fluoropolymer and/or the window rigid bottom portion 112 is comprised of glass.

As illustrated, the plurality of clamp draw-in pins includes four draw-in pins 140. However, it should be understood that any suitable number of draw-in pins (more or less than four) may be used to secure the cassette 100 in a stereolithography apparatus.

In some embodiments, the window 110 is generally flat and planar.

In some embodiments, the frame 120 has a unique identifier (e.g., an NFC tag) connected thereto. Accordingly, the cassette 100 may be identified by a tag reader, for example, for tracking the usage of the cassette 100 in the stereolithography apparatus.

As shown in FIG. 9, the frame internal wall portion 120C has a top segment 120C' adjacent the frame top portion 120A, a bottom segment 120C" adjacent said window 110, and an intermediate segment 120C''' between said top segment 120C' and bottom segment 120C". As shown, the bottom segment 120C" and the top segment 120C' have a steeper slope than that of the intermediate segment 120C'''. Accordingly, the segments are configured to facilitate the flow of polymerizable resin onto the light-transmissive window during additive manufacturing of at least one object thereon due to the slope of the wall portion 120C.

As illustrated, the first and second ports 150A, 150B are positioned on the cassette 100 and include a "suction cup" compressible seal mounted on an end of the ports 150A, 150B for connection to a fluid (gas) supply and to provide an inlet and an outlet to the fluid flow region 116. However, the suction cup seal could be on the stereolithography apparatus. Any suitable configuration may be used to provide an inlet/outlet on the cassette 100. For example, ports may be provided on the stereolithography apparatus and the inlet/outlet on the cassette 100 may be configured to fluidly communicate with ports on the stereolithography apparatus. Thus, the inlet/outlet on the cassette 100 may be any suitable inlet/outlet orifice and can be shaped as an extended or recessed or flush opening on the window cassette frame 120.

The foregoing is illustrative of the present invention, and is not to be construed as limiting thereof. The invention is defined by the following claims, with equivalents of the claims to be included therein.

I claim:

1. A removable window cassette for a bottom-up stereolithography apparatus, comprising:
    (a) a light-transmissive window having a rigid bottom portion, a semipermeable top portion, and a fluid flow region therebetween;
    (b) a circumferential frame surrounding said window and into which said window is recessed, said frame having a top portion, a bottom portion, and an internal wall portion, said frame internal wall portion defining with said window semipermeable top portion a well into which a polymerizable liquid is received; and (c) a plurality of clamp draw-in pins connected to said frame bottom portion and extending downward therefrom; and (d) at least a first and second port connected to said frame bottom portion, with said first port in fluid communication with said second port through said window fluid flow region.

2. The cassette of claim 1, wherein said circumferential frame is rectangular.

3. The cassette of claim 2, wherein said circumferential frame has a front portion, a back portion, and opposite side portions, with said first port positioned on one of said side portions, and said second port positioned on the other of said side portions.

4. The cassette of claim 2, wherein said circumferential frame has a front portion, a back portion, and opposite side portions, wherein a lifting slot is formed in each of said side portions, and wherein said lifting slots are parallel to and aligned with one another.

5. The cassette of claim 4, wherein said lifting slots extend through said frame front portion.

6. The cassette of claim 1, wherein said window semipermeable top portion is comprised of a fluoropolymer.

7. The cassette of claim 1, wherein said window rigid bottom portion is comprised of glass.

8. The cassette of claim 1, wherein said plurality of clamp draw-in pins comprises four draw-in pins.

9. The cassette of claim 1, wherein said window is planar.

10. The cassette of claim 1, said frame having a unique identifier connected thereto.

11. The cassette of claim 1, wherein said frame internal wall portion has a top segment adjacent said frame top portion, a bottom segment adjacent said window, and an intermediate segment between said top segment and bottom segment, and wherein both said bottom segment and said top segment have a steeper slope than that of said intermediate segment.

12. The cassette of claim 10, wherein said unique identifier comprises a near field communication (NFC) tag.

13. The cassette of claim 11, wherein said top segment, said bottom segment, and said intermediate segment are configured to facilitate a flow of polymerizable resin onto the light transmissive window during additive manufacturing of at least one object thereon.

14. The cassette of claim 4, wherein the lifting slots are configured to lift the frame together with the window when the draw-in pins are disengaged from a stereolithography apparatus.

15. The cassette of claim 1, wherein the clamp draw-in pins extend below the window.

* * * * *